United States Patent Office 3,579,401
Patented May 18, 1971

3,579,401
PROCESS FOR PRODUCING THERMAL INSULATING CARBONIZED FELT LAMINATED ASSEMBLIES
Roland Cauville and Andre Pernollet, Paris, and Gilberte Moutaud, Neuilly-sur-Seine, France, assignors to Societe le Carbone Lorraine, Paris, France
No Drawing. Filed June 30, 1967, Ser. No. 650,191
Claims priority, application France, July 26, 1966, 70,918
Int. Cl. C09j 5/00; C10b 49/00; F16l 59/00
U.S. Cl. 156—327                 4 Claims

ABSTRACT OF THE DISCLOSURE

A low density carbon felt assembly for thermal insulation is made by arranging a number of layers of viscose rayon felt coated with a relatively small amount of furane resin, applying a very light pressure, e.g. about 5 g./cm.$^2$, polymerising at atmospheric conditions, and carbonising at a temperature of 900° to 1200° C. The layers may be stacked one upon another, or wound in approximately cylindrical layers one around the other. The carbonised product may be graphitised at 2400° to 3000° C. Thus, a thermal insulating carbonized or graphitized viscose rayon having a density of less than 0.485 gm./cm.$^3$ is produced.

---

A carbon felt assembly for thermal insulation is made from layers of viscose rayon felt, cemented by a thermosetting resin, polymerised and carbonised and, if desired, graphitised.

The present invention relates to a carbon felt assembly for thermal insulation and to a method for its manufacture.

It is an object of the present invention to provide an improved material for thermal insulation products.

Another object is to provide a method for manufacturing an improved material for thermal insulation.

A further object is to provide an improved furnace thermal insulation from carbon felt.

This assembly is produced from layers such as sheets or plates made of pure viscose rayon felt cemented with a carbonisable thermosetting resin. The cemented assembly is polymerised and carbonised, preferably at 900° to 1200° C., and can, if necessary, be graphitised at 2400° to 3000° C.

The assemblies thus obtained (in such forms as plates or sleeves) are very suitable for the thermal insulation of furnaces.

Assemblies may be fabricated into various other forms by suitable conventional methods such as milling or machining.

In order that the invention may be more clearly understood, several embodiments are described below purely by way of illustrative but non-limiting examples.

EXAMPLE I

The raw materials are felt made of pure viscose rayon and an adhesive constituted by a furane resin including 1% catalyst.

To obtain a plate-like assembly, there are used layers of felt with a thickness of 25 to 35 mm. whose weight per square meter is 6 kg. Each layer is coated with the thickened resin (about 0.2 g./cm.$^2$) i.e. in small amounts relative to the weight of the viscose rayon. A certain number of layers is stacked, then a light pressure (about 5 g./cm.$^2$) is applied and the stack is left to polymerise for about 5 days at ambient temperature.

The assembly is then placed in a metal or refractory crucible, and carbonised at a final temperature of 1100° C., the rate of temperature rise being from 3° C. to 30° C. per hour. The shrinkage during the carbonisation is of the order of 25 to 30%. The resin and the felt have a shrinkage of the same order of magnitude.

EXAMPLE II

In the case of manufacturing a sleeve, a felt is used with a thickness of 14 to 15 mm., whose weight per square meter is from 2 to 4 kg. The felt, internally coated with resin, is wound on a shape, a cardboard tube for example. It is pressed lightly then polymerised and carbonised.

A modification to the above described process consists in starting with layers of felt which has already been carbonised. Then the adhesive is deposited solely at small localised zones, so as not to load the felt too much with resin and consequently coke. The assembly is carbonised as previously.

The assemblies according to the present invention are used for thermal insulation in furnaces operating at high temperature or incovers of furnaces.

For use at very high temperatures or under vacuum, the assembly can be treated at the usual temperatures of graphitation.

It will be apparent that various changes and modifications may be made in the examples described above without departing from the essential concept of the invention.

We claim:

1. A process for producing a thermal insulating carbonized viscose rayon felt laminate having a density less than 0.485 gm./cm.$^3$ comprising the steps of forming a laminate having a plurality of layers of viscose rayon felt bound together by a carbonizable thermosetting resin, applying a pressure of about 5 gm./cm.$^2$ to said laminate layers, polymerizing said thermosetting resin, and carbonizing said laminate at a temperature of 900°–1200° C.

2. The process of claim 1, in which said carbonizable adhesive is a furane resin.

3. A process according to claim 1, wherein the layers of said laminate are wound in approximately cylindrical form one around the other.

4. A process according to claim 1, wherein the carbonised product is subsequently graphitised at a temperature of 2400° to 3000° C.

References Cited

UNITED STATES PATENTS

| | | | |
|---|---|---|---|
| 3,492,197 | 1/1970 | Olstowski et al. | 252—502X |
| 3,503,118 | 3/1970 | Criscione et al. | 161—182X |
| 2,266,917 | 12/1941 | Strauch | 126—99 |
| 2,449,937 | 9/1948 | Groetchen | 126—273 |
| 3,174,895 | 3/1965 | Gibson et al. | 161—259 |
| 3,187,089 | 6/1965 | Cosby et al. | 174—94 |
| 3,275,488 | 9/1966 | Bailey et al. | 156—89 |
| 3,312,271 | 4/1967 | Beach et al. | 126—273X |
| 3,395,970 | 8/1968 | Machell | 23—209.4X |

HAROLD ANSHER, Primary Examiner

U.S. Cl. X.R.

23—209.4, 209.6; 161—182, 260; 252—62, 502